(12) United States Patent
Kim et al.

(10) Patent No.: US 11,499,009 B2
(45) Date of Patent: Nov. 15, 2022

(54) LIQUID CRYSTAL POLYMER, COMPOSITE COMPOSITION, ARTICLE, BATTERY CASE, AND BATTERY

(71) Applicant: SAMSUNG ELECTRONICS CO., LTD., Suwon-si (KR)

(72) Inventors: In Ki Kim, Hwaseong-si (KR); Feifei Fang, Suwon-si (KR); In Su Lee, Hwaseong-si (KR); Hyoungwoo Choi, Hwaseong-si (KR); In Kim, Suwon-si (KR); Kyeong Pang, Suwon-si (KR); Sung Dug Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 538 days.

(21) Appl. No.: 16/688,203

(22) Filed: Nov. 19, 2019

(65) Prior Publication Data
US 2020/0190256 A1 Jun. 18, 2020

(30) Foreign Application Priority Data
Nov. 21, 2018 (KR) .................. 10-2018-0144608

(51) Int. Cl.
*H01M 4/02* (2006.01)
*C08G 63/60* (2006.01)
(Continued)

(52) U.S. Cl.
CPC .............. *C08G 63/605* (2013.01); *C08K 3/22* (2013.01); *H01M 50/116* (2021.01); *H01M 50/155* (2021.01); *C08K 2003/2206* (2013.01)

(58) Field of Classification Search
CPC ...................................................... H01M 4/02
See application file for complete search history.

(56) References Cited

U.S. PATENT DOCUMENTS

| 4,719,159 A | 1/1988 | Cataldi et al. |
| 4,751,128 A | 6/1988 | Blinne et al. |
| (Continued) | | |

FOREIGN PATENT DOCUMENTS

| JP | 05140280 A | 6/1993 |
| JP | 09188804 A | 7/1997 |
| (Continued) | | |

*Primary Examiner* — Jacob B Marks
(74) *Attorney, Agent, or Firm* — Cantor Colburn LLP (57) ABSTRACT

A liquid crystal polymer including structural units derived from an aromatic hydroxy carboxylic acid in an amount of greater than about 30 mol % and less than or equal to about 50 mol %, an aromatic dicarboxylic acid which includes about 50 mol % or greater of a structural unit derived from a compound including two carboxyl groups at a meta-position of an aromatic ring in an amount greater than or equal to about 50 mol % of the amount of the structural unit derived from the aromatic hydroxy carboxylic acid, each based on total moles of the structural units in the liquid crystal polymer, and an aromatic diol that is 4,4'-dihydroxybiphenyl, hydroquinone, or a combination thereof; a composite composition including the liquid crystal polymer, an article produced from the liquid crystal polymer or the composite composition, a battery case including the article, and a battery including the battery case and an electrode assembly.

20 Claims, 2 Drawing Sheets

(51) Int. Cl.
*C08K 3/22* (2006.01)
*H01M 50/116* (2021.01)
*H01M 50/155* (2021.01)

(56) References Cited

U.S. PATENT DOCUMENTS

| | | | |
|---|---|---|---|
| 4,874,563 A * | 10/1989 | McMahon | B29B 15/12 |
| | | | 264/DIG. 75 |
| 5,453,469 A | 9/1995 | Yezrielev et al. | |
| 5,885,732 A | 3/1999 | Verhoog | |
| 6,296,930 B1 | 10/2001 | Akiyoshi et al. | |
| 6,350,822 B1 | 2/2002 | Van Diepen et al. | |
| 6,376,076 B1 | 4/2002 | Ohbe et al. | |
| 6,602,637 B1 | 8/2003 | Kurasawa et al. | |
| 6,635,380 B1 | 10/2003 | Shimoda et al. | |
| 6,664,341 B2 | 12/2003 | Kitayama et al. | |
| 7,087,704 B2 | 8/2006 | Kanaka et al. | |
| 7,294,431 B2 | 11/2007 | Puttaiah et al. | |
| 8,715,526 B2 | 5/2014 | Kitai et al. | |
| 9,011,743 B2 | 4/2015 | Funatsu et al. | |
| 9,187,639 B2 | 11/2015 | Zheng et al. | |
| 9,206,300 B2 | 12/2015 | Zhao et al. | |
| 9,419,315 B2 | 8/2016 | Tyler et al. | |
| 10,377,851 B2 | 8/2019 | Ishizu et al. | |
| 2011/0210290 A1 | 9/2011 | Harada et al. | |
| 2011/0213077 A1 | 9/2011 | Bertucci et al. | |
| 2014/0088287 A1 | 3/2014 | Murouchi et al. | |
| 2015/0150822 A1 | 6/2015 | Perumal et al. | |
| 2017/0291988 A1 | 10/2017 | Ishizu et al. | |

FOREIGN PATENT DOCUMENTS

| | | |
|---|---|---|
| JP | 11349794 A | 12/1999 |
| JP | 2000063503 A | 2/2000 |
| JP | 2000143947 A | 5/2000 |
| JP | 2002363281 A | 12/2002 |
| JP | 2006188570 A | 7/2006 |
| JP | 2007126578 A | 5/2007 |
| JP | 2010209495 A | 9/2010 |
| JP | 2016523291 A | 8/2016 |
| JP | 6131638 B2 | 5/2017 |
| JP | 2017137438 A | 8/2017 |
| JP | 6225297 B1 | 10/2017 |
| KR | 20000070654 A | 11/2000 |
| KR | 20020026881 A | 4/2002 |
| KR | 20110098651 A | 9/2011 |
| KR | 20130108144 A | 2/2013 |
| KR | 20140021580 A | 2/2014 |
| KR | 20130061664 A | 12/2014 |
| KR | 1020150080801 A | 7/2015 |
| KR | 20160016963 A | 5/2016 |
| KR | 1020170063566 A | 6/2017 |
| KR | 20170122166 A | 11/2017 |

\* cited by examiner

LIQUID CRYSTAL POLYMER, COMPOSITE COMPOSITION, ARTICLE, BATTERY CASE, AND BATTERY

CROSS-REFERENCE TO RELATED APPLICATION

This application claims priority to and the benefit of Korean Patent Application No. 10-2018-0144608 filed in the Korean Intellectual Property Office on Nov. 21, 2018, the entire contents of which are incorporated herein by reference.

BACKGROUND

1. Field

This disclosure relates to a liquid crystal polymer, a composite composition including the liquid crystal polymer and an inorganic moisture absorbent, an article produced from the liquid crystal polymer or the composite composition, and a battery case and a battery including the article.

2. Description of the Related Art

As various types of mobile electronic devices and various types of electric powered transportation, e.g., electric powered passenger or commercial vehicles, are developed, research on a case for protecting a power source for example, a battery for supplying an electric power (or power) to these devices and vehicles or means of protection from external moisture or impact is of great interest and actively being pursued. Research on plastic materials that may replace a metal case to satisfy the same level of moisture transmission resistivity and mechanical properties as a conventional metal case is of great interest.

SUMMARY

An embodiment provides a liquid crystal polymer having high moisture transmission resistivity and mechanical properties.

Another embodiment provides a composite composition including the liquid crystal polymer and an inorganic moisture absorbent.

Another embodiment provides an article including the liquid crystal polymer or the composite composition including the liquid crystal polymer and the inorganic moisture absorbent.

Another embodiment provides a battery case having high moisture transmission resistivity and mechanical strength.

Another embodiment provides a battery including a battery case having high moisture transmission resistivity and mechanical strength and an electrode assembly accommodated in the battery case.

In an embodiment, a liquid crystal polymer includes structural units derived from an aromatic hydroxy carboxylic acid, an aromatic dicarboxylic acid, and an aromatic diol, wherein based on total moles of the structural units in the liquid crystal polymer, the structural unit derived from the aromatic hydroxy carboxylic acid is included in an amount of greater than about 30 mole percent (mol %) and less than or equal to about 50 mol %, the structural unit derived from the aromatic dicarboxylic acid includes 50 mol % or greater of a structural unit derived from a compound including two carboxyl groups at a meta-position of an aromatic ring, and an amount of the structural unit derived from the compound including two carboxyl groups at a meta-position of an aromatic ring is greater than or equal to about 50 mol % of the amount of the structural unit derived from the aromatic hydroxy carboxylic acid, and the structural unit derived from the aromatic diol includes structural units derived from 4,4'-dihydroxybiphenyl (BP) and hydroquinone (HQ).

The structural unit derived from the aromatic hydroxy carboxylic acid may be represented by Chemical Formula 1 or Chemical Formula 2:

Chemical Formula 1

Chemical Formula 2

The structural unit derived from the aromatic hydroxy carboxylic acid may include a structural unit derived from p-hydroxybenzoic acid, a structural unit derived from 6-hydroxy-2-naphthoic acid, or a combination thereof.

The structural unit derived from the compound including two carboxyl groups at the meta-position of the aromatic ring may include a structural unit derived from isophthalic acid (IPA).

The amount of the structural unit derived from the compound including two carboxyl groups at the meta-position of the aromatic ring may be greater than or equal to about 60 mol % of the amount of the structural unit derived from the aromatic hydroxy carboxylic acid.

The amount of the structural unit derived from the compound including two carboxyl groups at the meta-position of the aromatic ring may be greater than or equal to about 70 mol % of the amount of the structural unit derived from the aromatic hydroxy carboxylic acid.

A mole ratio of the structural unit derived from hydroquinone (HQ) relative to the structural unit derived from 4,4'-dihydroxybiphenyl (BP) in the structural unit derived from the aromatic diol may be greater than or equal to about 1:1. A mole ratio of the structural unit derived from hydroquinone (HQ) relative to the structural unit derived from 4,4'-dihydroxybiphenyl (BP) in the structural unit derived from the aromatic diol may be greater than or equal to about 1:1 and less than about 5:1.

In an embodiment, a composite composition may include the liquid crystal polymer according to an embodiment and inorganic moisture absorbent.

The inorganic moisture absorbent may include a silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$), $Ba(ClO_4)_2$, Ca, or a combination of two or more.

The inorganic moisture absorbent may be included in an amount of less than or equal to about 30 weight percent (wt %) based on a total weight of the composite composition.

In an embodiment, an article may include the liquid crystal polymer or a composite composition.

The article may have a water vapor transmission rate (WVTR) of less than or equal to about 0.1 gram per square meter per day (g/m²/day) measured at 38° C. under a relative humidity of 100% according to ISO 15106 or ASTM F1249, and an impact strength measured according to ASTM D256 of greater than about 35 kiloJoules per square meter ($kJ/m^2$).

The article may include the composite composition, and the composite composition may include the inorganic moisture absorbent in an amount of greater than or equal to about 1 wt % and less than or equal to about 30 wt % based on a total weight of the composition.

When the article includes the composite composition including the inorganic moisture absorbent in an amount of greater than or equal to about 1 wt % and less than or equal to about 30 wt %, the article may have a water vapor transmission rate (WVTR) of less than about 0.07 $g/m^2$/day measured at 38° C. under relative humidity of 100% according to ISO 15106 and ASTM F1249 and an impact strength measured according to ASTM D256 of greater than or equal to about 59 $kJ/m^2$.

In an embodiment, the battery case may include an article.

The battery case may include a container configured to accommodate an electrode assembly, the container may include a bottom wall and a plurality of side walls, a side opposed to the bottom wall is open to accommodate an electrode assembly, and the battery case may include a lid configured to cover at least a portion of the open side.

The lid may include at least one of a positive electrode terminal and a negative electrode terminal.

The container may include a plurality of cell compartments separated by at least one partition wall.

In an embodiment, a battery may include a battery case and an electrode assembly including a positive electrode and a negative electrode accommodated in the container of the battery case.

The liquid crystal polymer according to an embodiment is prepared by specific types and compositions of aromatic monomers, and an article manufactured therefrom has improved moisture transmission resistivity and simultaneously improved mechanical properties such as tensile strength and impact strength. Therefore, an article manufactured from the liquid crystal polymer according to an embodiment or the composite composition including the liquid crystal polymer and an inorganic moisture absorbent may have improved moisture transmission resistivity and mechanical properties. Such an article may be useful in a variety of electronic, mechanical, and electrical devices requiring improved moisture transmission resistivity and mechanical properties. Devices requiring improved moisture transmission resistivity and mechanical properties may be a rechargeable lithium battery, a wearable device, a smart phone, a tablet personal computer, an organic light emitting diode (OLED), a solar cell, a 5G flexible circuit board (FCB), and the like.

DETAILED DESCRIPTION

Hereinafter, embodiments of the present invention are described in detail. However, these embodiments are exemplary, the present invention is not limited thereto, and the present invention is defined by the scope of claims.

If not defined otherwise, all terms (including technical and scientific terms) in the specification may be defined as commonly understood by one skilled in the art. The terms defined in a generally-used dictionary may not be interpreted ideally or exaggeratedly unless clearly defined. Accordingly, terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In addition, unless explicitly described to the contrary, the word "comprise" and variations such as "comprises" or "comprising", will be understood to imply the inclusion of stated elements but not the exclusion of any other elements.

Further, the singular includes the plural unless mentioned otherwise.

The terminology used herein is for the purpose of describing particular embodiments only and is not intended to be limiting. As used herein, the singular forms "a", "an", and "the" are intended to include the plural forms, including "at least one", unless the content clearly indicates otherwise. "At least one" is not to be construed as limiting "a" or "an". "Or" means "and/or". As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the drawings, the thickness of each element is exaggerated for better comprehension and ease of description. Like reference numerals designate like elements throughout the specification. It will be understood that when an element such as a layer, film, region, or plate is referred to as being "on" another element, it can be directly on the other element or intervening elements may also be present. In contrast, when an element is referred to as being "directly on" another element, there are no intervening elements present.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As use herein, "*" indicates a point of attachment to an atom.

Research on an electric vehicle (EV) using at least one battery system to supply a portion or all motive power is of great interest and actively being pursued. It can be expected that an electric vehicle discharges significantly less contamination material to the environment compared with a traditional vehicle operated by an internal combustion engine. Some electric vehicles using electricity use no gasoline at all or obtain entire motive power from electricity. As research on the electric vehicles increases, demands for an improved power source for vehicles, for example, an improved battery module increases.

A rechargeable lithium battery capable of being charged and discharged and having high energy density can be an electrochemical device that includes a battery module for the electric vehicles. However, for a rechargeable lithium battery, when moisture permeates a battery's exterior case, hydrofluoric acid (HF) is generated within the battery and can damage an electrode resulting in performance degradation of the battery. Presently, in order to minimize moisture from getting through the batter case, and hopefully to prevent this performance degradation, an aluminum material having improved moisture transmission resistivity may be used as a case for a rechargeable lithium battery. That is, an electrode assembly including positive and negative electrodes is inserted into a case such as an aluminum pouch, and sealed to make a battery cell. A plurality of the battery cells can be used to form a battery module. However, because this method can require a complicated assembly process, extended fabrication times, and be high cost, alternative integrated cases for battery cell-modules are of interest and are needed. Accordingly, research is underway to realize a battery cell-module integration structure without a need to fabricate a separate battery cell after forming an electrode assembly. However, in order to realize such a cell-module integrated structure, performance parameters, such as mechanical strength, moisture transmission resistivity, and the like also require technical consideration.

Since a battery case formed of a conventional metal is limited in shape due to a limit in terms of a metal manufacture technology, and a battery case having a desired shape or size requires a multistep process, a high cost, and a significant amount of production time. In addition, with a metal case of a large size or with a plurality of containers to accommodate a plurality of battery cells, due to a weight of a metal itself, the case becomes very heavy and costs increase. Accordingly, commercial demands and requests for novel materials desirable for manufacturing an efficient battery case and a battery using a same battery case capable of solving problems of heat management, moisture transmission, and the like, and having a low manufacturing cost are described herein.

A liquid crystal polymer (LCP) is an engineering plastic having high heat resistance and tensile strength as an aromatic polyester made from an aromatic monomer. The liquid crystal polymer has structurally rigid characteristics by having a benzene ring and an ester group as a backbone, and the product made from the liquid crystal polymer tends to have superior tensile strength and moisture transmission resistivity compared with other more commonly-used polymers, but inferior impact properties (impact strength) due to the rigid backbone structure. In order to improve the impact strength of the liquid crystal polymer, an inorganic filler, an impact-reinforcing material, and the like may be added thereto, but this can unfavorably affect the moisture transmission resistivity. In addition, when an inorganic moisture absorbent or the like is added in order to improve moisture transmission resistivity of the liquid crystal polymer, and the like, the article produced therefrom tends to have better moisture transmission resistivity but inferior mechanical properties such as impact strength and tensile strength. Thus it is difficult to improve both moisture transmission resistivity and mechanical properties of the liquid crystal polymer at the same time.

The present Inventors disclose a liquid crystal polymer in which both mechanical properties and moisture transmission resistivity are improved, and resulting in a liquid crystal polymer having significantly improved mechanical properties such as impact strength and tensile strength having improved moisture transmission resistivity compared to the moisture transmission resistivity of the conventional liquid crystal polymer. Particularly, when used with the inorganic moisture absorbent, mechanical properties such as impact strength and tensile strength are further improved or are similar to those before adding the inorganic moisture absorbent while, the moisture transmission resistivity is significantly improved.

A liquid crystal polymer according to an embodiment having improved moisture transmission resistivity and mechanical properties includes structural units derived from an aromatic hydroxy carboxylic acid, an aromatic dicarboxylic acid, and an aromatic diol, based on total moles of the structural units in the liquid crystal polymer. The structural unit derived from the aromatic hydroxy carboxylic acid is included in an amount of greater than about 30 mol % and less than or equal to about 50 mol %; the structural unit derived from the aromatic dicarboxylic acid includes about 50 mol % or greater of a structural unit derived from a compound including two carboxyl groups at a meta-position of an aromatic ring, wherein an amount of the structural unit derived from the compound including two carboxyl groups at a meta-position of an aromatic ring is greater than or equal to about 50 mol % of the amount of the structural unit derived from the aromatic hydroxy carboxylic acid; and the structural unit derived from the aromatic diol includes structural units derived from 4,4'-dihydroxybiphenyl (BP) and hydroquinone (HQ).

The structural unit derived from the aromatic hydroxy carboxylic acid may be a structural unit derived from glycolic acid, 6-hydroxy-2-naphthoic acid, 6-hydroxy-1-naphthoic acid, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2, 5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5, 7-dichloro-2-naphthoic acid, p-β-hydroxyethoxybenzoic acid, or a combination thereof, but is not limited thereto.

In an embodiment, the structural unit derived from the aromatic hydroxy carboxylic acid may be represented by Chemical Formula 1 or Chemical Formula 2:

Chemical Formula 1

Chemical Formula 2

In an embodiment, the structural unit represented by Chemical Formula 1 may be derived from p-hydroxybenzoic acid (HBA) and the structural unit represented by Chemical Formula 2 may be derived from 6-hydroxy-2-naphthoic acid (HNA).

In an embodiment, the structural unit derived from the aromatic hydroxy carboxylic acid may include a structural unit derived from p-hydroxybenzoic acid.

In an embodiment, the structural unit derived from the compound including two carboxyl groups at the meta-position of the aromatic ring of the structural unit derived from the aromatic dicarboxylic acid may be represented by Chemical Formula 3 or Chemical Formula 4:

Chemical Formula 3

Chemical Formula 4

In an embodiment, the structural unit derived from the compound including two carboxyl groups at the meta-position of the aromatic ring of the structural unit derived from the aromatic dicarboxylic acid may include a structural unit derived from isophthalic acid (IPA) and represented by Chemical Formula 3.

In an embodiment, the structural unit derived from the aromatic dicarboxylic acid may include a structural unit derived from a compound including two carboxyl groups at a meta-position of an aromatic ring in an amount of greater than or equal to about 55 mol %, for example, greater than or equal to about 60 mol %, greater than or equal to about 65 mol %, greater than or equal to about 70 mol %, greater than or equal to about 75 mol %, greater than or equal to about 80 mol %, greater than or equal to about 85 mol %, greater than or equal to about 90 mol %, greater than or equal to about 95 mol %, or about 100 mol %. In other words, in an embodiment, the structural unit derived from the aromatic dicarboxylic acid may consist of a structural unit derived from a compound including two carboxyl groups at a meta-position of an aromatic ring.

In an embodiment, the structural unit derived from the compound including two carboxyl groups at the meta-position of the aromatic ring, for example, a structural unit derived from isophthalic acid (IPA) may be included in greater than or equal to about 50 mol % of the amount of the structural unit derived from the aromatic hydroxyl carboxylic acid, for example, HBA, for example, greater than about 50 mol %, greater than or equal to about 55 mol %, greater than or equal to about 60 mol %, greater than or equal to about 65 mol %, greater than or equal to about 70 mol %, or greater than or equal to about 75 mol %, for example, about 55 mol % to about 75 mol %, about 60 mol % to about 75 mol %, or about 70 mol % to about 75 mol %.

As understood from Examples and Comparative Examples which will be described below, when the liquid crystal polymer includes a structural unit derived from an aromatic hydroxy carboxylic acid in an amount of greater than about 30 mol % and less than or equal to about 50 mol % based on total moles of the structural units, and the structural unit derived from an aromatic dicarboxylic acid includes a structural unit derived from a compound including two carboxyl groups at a meta-position of an aromatic ring in greater than or equal to about 50 mol %, simultaneously, an amount of the structural unit derived from the compound including two carboxyl groups at the meta-position of the aromatic ring is greater than or equal to about 50 mol % of the amount of the structural unit derived from the aromatic hydroxy carboxylic acid, and the structural unit derived from aromatic diol includes structural units derived from 4,4'-dihydroxybiphenyl (BP) and hydroquinone (HQ), impact strength and tensile strength are improved almost all cases compared to the liquid crystal polymer not satisfying such conditions. Furthermore, although impact strength or moisture transmission resistivity of the article made of only the liquid crystal polymer according to an embodiment is not significantly improved, an article made from a composite composition prepared by adding a known inorganic moisture absorbent for improving moisture transmission resistivity thereto may have unexpected effects that moisture transmission resistivity is significantly improved, and at the same time, mechanical properties such as impact strength and/or tensile strength are also improved. One of ordinary skill in the art would not have anticipated this result, i.e., improvement in one or more mechanical properties when moisture transmission resistivity is to be improved by adding an inorganic absorber to the conventional liquid crystal polymer.

In an embodiment, the aromatic hydroxy carboxylic acid may be p-hydroxy benzoic acid (HBA), and the liquid crystal polymer according to an embodiment may include a structural unit derived from p-hydroxybenzoic acid (HBA) in an amount of greater than about 32 mol % and less than or equal to about 50 mol %, for example, greater than or equal to about 32 mol % and less than or equal to about 49 mol %, or greater than or equal to about 33 mol % and less than or equal to about 49 mol %, based on total moles of the structural units.

The liquid crystal polymer according to an embodiment, provided that the structural unit derived from the aromatic dicarboxylic acid may include a structural unit derived from a compound including two carboxyl groups at a meta-position of an aromatic ring in an amount of greater than or equal to about 50 mol %, and that the amount is greater than or equal to about 50% of the amount of the structural unit derived from the aromatic hydroxy carboxylic acid, other structural unit derived from an aromatic dicarboxylic acid may be further included, that is, a structural unit derived from a compound including two carboxyl groups at other positions except the meta-position of the aromatic ring, for example, a para-position of the aromatic ring, may be further included. In an embodiment, the structural unit derived from the compound having two carboxyl groups at the para-position of the aromatic ring may be represented by Chemical Formula 5 or 6:

Chemical Formula 5

Chemical Formula 6

In an embodiment, the structural unit derived from the compound including two carboxyl groups at the para-position of the aromatic ring as the aromatic dicarboxylic acid compound may be a structural unit represented by Chemical Formula 5 which is derived from terephthalic acid (TPA). In an embodiment, the structural unit derived from terephthalic acid may be included within a range of the remaining amount by subtracting an amount of the compound including two carboxyl groups at the meta-position of the aromatic ring, for example, the structural unit derived from IPA, from an amount of the total structural units derived from the aromatic dicarboxylic acid. Thus, the amount of the structural unit derived from terephthalic acid in the structural unit derived from aromatic dicarboxylic acid in the liquid crystal polymer according to an embodiment may be less than or equal to the amount of the structural unit derived from the compound including two carboxyl groups at the meta-position of the aromatic ring, for example, IPA. When the structural unit derived from aromatic diol includes both the structural units derived from hydroquinone (HQ) and 4,4'-dihydroxybiphenyl (BP), moisture transmission resistivity and impact strength and tensile strength are significantly improved than the examples including only a structural unit derived from either one of them. When only HQ is included in the aromatic diol components, the polymerized product is solidified, which makes it difficult to get polymerized.

In addition, when the structural unit derived from aromatic diol may include both the structural units derived from hydroquinone (HQ) and 4,4'-dihydroxybiphenyl (BP), wherein the amount of structural unit derived from HQ is higher than or equal to the amount of the structural unit derived from BP, the obtained liquid crystal polymer may have improved impact strength and tensile strength as well as improved moisture transmission resistivity, compared with an example including only the structural unit derived from BP or an example of including the structural unit derived from BP in a higher amount than the structural unit derived from HQ.

In an embodiment, an amount ratio of the structural unit derived from HQ with respect to the structural unit derived from BP may be greater than or equal to about 1:1, for example, greater than about 1:1, greater than or equal to about 1.1:1, greater than or equal to about 1.2:1, greater than or equal to about 1.3:1, greater than or equal to about 1.5:1, greater than or equal to about 1.7:1, greater than or equal to about 1.8:1, greater than or equal to about 2:1, or greater than or equal to about 2.5:1, and the amount ratio may be less than about 5:1, for example, less than about 4:1, or less than about 3:1; or greater than or equal to about 1:1 and less than about 5:1, for example, greater than about 1:1 and less than about 5:1, greater than about 1:1 and less than about 4:1, greater than about 1:1 and less than about 3:1, greater than or equal to about 1.2:1 and less than about 3:1, greater than or equal to about 1.2:1 and less than or equal to about 2.7:1, greater than or equal to about 1.2:1 and less than or equal to about 2.5:1, greater than or equal to about 1.5:1 and less than or equal to about 2.5:1, greater than or equal to about 1.5:1 and less than or equal to about 2.3:1, or greater than or equal to about 1.5:1 and less than or equal to about 2:1, but may not be limited thereto.

In an embodiment, the liquid crystal polymer may include the structural unit derived from aromatic hydroxy dicarboxylic acid, for example, p-hydroxybenzoic acid (HBA), 6-hydroxy-2-naphthoic acid (HNA), or a combination thereof in an amount of greater than or equal to about 33 mol % and less than about 50 mol %, for example, about 34 mol % to about 49 mol %, about 35 mol % to about 49 mol %, about 35 mol % to about 48 mol %, about 36 mol % to about 48 mol %, about 36 mol % to about 47 mol %, or about 36 mol % to about 46 mol % based on total moles of the structural units; and the structural unit derived from the aromatic dicarboxylic acid may include a structural unit derived from isophthalic acid (IPA) in an amount of greater than or equal to about 50 mol %, simultaneously, an amount of the structural unit derived from IPA may be greater than or equal to about 50 mol % of the amount of the structural unit derived from aromatic hydroxy dicarboxylic acid; and the structural unit derived from the aromatic diol may include a structural unit derived from BP and a structural unit derived from HQ, wherein a mole ratio of the structural unit derived from HQ to the structural unit derived from BP may be greater than or equal to about 1:1 and less than about 5, for example, greater than about 1 and less than about 5:1, greater than or equal to about 1.1:1 and less than about 4:1, greater than or equal to about 1.1:1 and less than about 3:1, greater than or equal to about 1.1:1 and less than or equal to about 2.5:1, greater than or equal to about 1.1:1 and less than or equal to about 2.4:1, or greater than or equal to about 1.1:1 and less than or equal to about 2.3:1.

The structural unit derived from the aromatic dicarboxylic acid and the structural unit derived from the aromatic diol may be included in the liquid crystal polymer in same amounts.

The liquid crystal polymer having the components and the composition ratio as described above may have excellent mechanical properties after shaping, for example, higher tensile strength and impact strength and moisture transmission resistivity than the liquid crystal polymer not satisfying the composition. When adding the liquid crystal polymer according to an embodiment with a known inorganic moisture absorbent, for example, any suitable inorganic moisture absorbent known for improving moisture transmission resistivity upon shaping together with the liquid crystal polymer, the obtained article may have further improved moisture transmission resistivity and also improved mechanical properties, such as, for example, impact strength and tensile strength, or may at least maintain its original properties. In an embodiment a composite composition may include the liquid crystal polymer and an inorganic moisture absorbent.

The inorganic moisture absorbent may include a silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$), $Ba(ClO_4)_2$, Ca, or a combination of two or more, but is not limited thereto. The inorganic moisture absorbent may include any suitable inorganic moisture absorbent which is known to improve the moisture transmission resistivity of the liquid crystal polymer. In an embodiment, the inorganic moisture absorbent may be CaO.

The inorganic moisture absorbent may be included in an amount of less than or equal to about 30 wt %, less than or equal to about 29 wt %, less than or equal to about 28 wt %, less than or equal to about 25 wt %, less than or equal to about 18 wt %, less than or equal to about 15 wt %, or less than or equal to about 10 wt % based on a total weight of the composite composition. In an embodiment, the inorganic moisture absorbent may be included in an amount of about 1 wt % to about 30 wt %, for example, about 3 wt % to about 30 wt %, about 5 to about 30 wt %, about 5 wt % to about 28 wt %, about 5 wt % to about 25 wt %, about 5 wt % to about 23 wt %, about 5 wt % to about 20 wt %, about 5 wt % to about 18 wt %, about 5 wt % to about 15 wt %, about 5 wt % to about 13 wt %, about 5 wt % to about 12 wt %, about 5 wt % to about 10 wt %, about 5 wt % to about 9 wt %, or about 5 wt % to about 8 wt % based on a total weight of the composite composition, but is not limited thereto.

The type and the amount of the inorganic moisture absorbent may be appropriately chosen by a person having an ordinary skill in the art considering the type and amount of each aromatic monomer for preparing the liquid crystal polymer, and the desirable moisture transmission resistivity and usage, and the like. The article obtained from the composite composition further including the inorganic moisture absorbent together with the liquid crystal polymer according to an embodiment may have significantly improved moisture transmission resistivity, as well as further improved mechanical properties such as impact strength and tensile strength. Thus, although the liquid crystal polymer according to an embodiment, by itself, may not show excellent moisture transmission resistivity and/or mechanical properties such as impact strength and tensile strength at the same time, it may provide an article having further excellent moisture transmission resistivity and mechanical properties when the article is produced by adding a suitable inorganic moisture absorbent to provide a composite and forming an article.

Accordingly, in further embodiments, an article may include the liquid crystal polymer according to an embodiment or the composite composition according to an embodiment.

As understood from Examples and Comparative Examples which will be described later, in a case of an article produced from the commercially available liquid crystal polymer consisting of the structural unit derived only from an aromatic hydroxy dicarboxylic acid of p-hydroxy-benzoic acid (HBA) and 6-hydroxy-2-naphthoic acid (HNA), moisture transmission resistivity is about 0.07 g/m$^2$/day, tensile strength is 1,547 kilogram-force per centimeter square (kgf/cm$^2$), which are acceptable, but impact strength is unfavorably reduced to 16 KJ/m$^2$. When the article is produced by adding 10 wt % of an inorganic moisture absorbent to the commercially available liquid crystal polymer to improve moisture transmission resistivity, moisture transmission resistivity is 0.002 g/m$^2$/day which is improved by 10 times or higher, but mechanical properties deteriorate, in that impact strength is reduced to 10 kJ/m$^2$, and tensile strength is also reduced to 1,494 kgf/cm$^2$.

When an article is produced by adding the liquid crystal polymer according to an embodiment with 10 wt % of CaO, moisture transmission resistivity of all obtained articles is improved to less than 0.0005 g/m$^2$/day, and impact strength and tensile strength are also improved, so moisture transmission resistivity and mechanical properties both are improved. This was an unexpected effect as the same improvement was not observed in the article produced from the conventional liquid crystal polymer or a composite in which an inorganic moisture absorbent is added thereto.

The manufacturing method of the article is not particularly limited, and any suitable manufacturing method can be used. For example, the article may be produced by molding the liquid crystal polymer or the composite composition according to an embodiment to obtain a pellet and molding the pellet to have a desired shape through an extrusion molding machine or an injection molding machine. Any suitable extrusion molding machine and the injection molding machine can be used. Commercially available extrusion molding machine or injection molding machine can also be used. In addition, the molding may include other suitable methods, such as, for example, extrusion molding, injection molding, blow molding, press molding, and the like, to obtain a desired size and shape.

In an embodiment, the article may be made of only the liquid crystal polymer according to an embodiment without the inorganic moisture absorbent, the article may have a water vapor transmission rate (WVTR) of less than or equal to about 0.1 g/m$^2$/day, measured at 38° C. under relative humidity of 100% according to ISO 15106 or ASTM F1249 and an impact strength of greater than about 35 kJ/m$^2$, measured according to ASTM D256.

In an embodiment, the article may be formed from the composite composition including a liquid crystal polymer and an inorganic moisture absorbent, the article may have a water vapor transmission rate (WVTR) of less than about 0.07 g/m$^2$/day, measured at 38° C. under relative humidity of 100% according to ISO 15106 or ASTM F1249 and impact strength of greater than or equal to about 59 kJ/m$^2$ measured according to ASTM D256.

The article with improved moisture transmission resistivity and the mechanical properties may be effectively applied for the various usages requiring high moisture transmission resistivity and mechanical properties, for example, a protecting membrane for energy, electric, and electronic devices which are critically affected by the exterior moisture permeation or are required to be protected from exterior physical impact, for example, a case for a lithium rechargeable battery and the like.

An embodiment provides a battery case including the article.

The battery case may include a container configured to accommodate an electrode assembly, the container may include a bottom wall and a plurality of side walls, a side opposed to the bottom wall is open to accommodate an electrode assembly, and the battery case may include a lid configured to cover at least a portion of the open side. In an embodiment, the lid may include at least one of a positive and a negative electrode terminal.

In an embodiment, the container may include a plurality of cell compartments partitioned by at least one partition wall, and each battery cell may be accommodated in each cell compartment.

An embodiment provides a battery including the battery case according to an embodiment and an electrode assembly including a positive electrode and a negative electrode and accommodated in the container of the battery case.

In an embodiment, the container of the battery case may include plurality of battery cell compartments partitioned by at least one partition wall, and the plurality of electrode assemblies including a negative electrode and a positive electrode may be accommodated in each cell compartment, a battery module including a plurality of battery cells may be provided.

Hereinafter, a battery case according to an embodiment is described with reference to the appended drawings.

Figure 1:
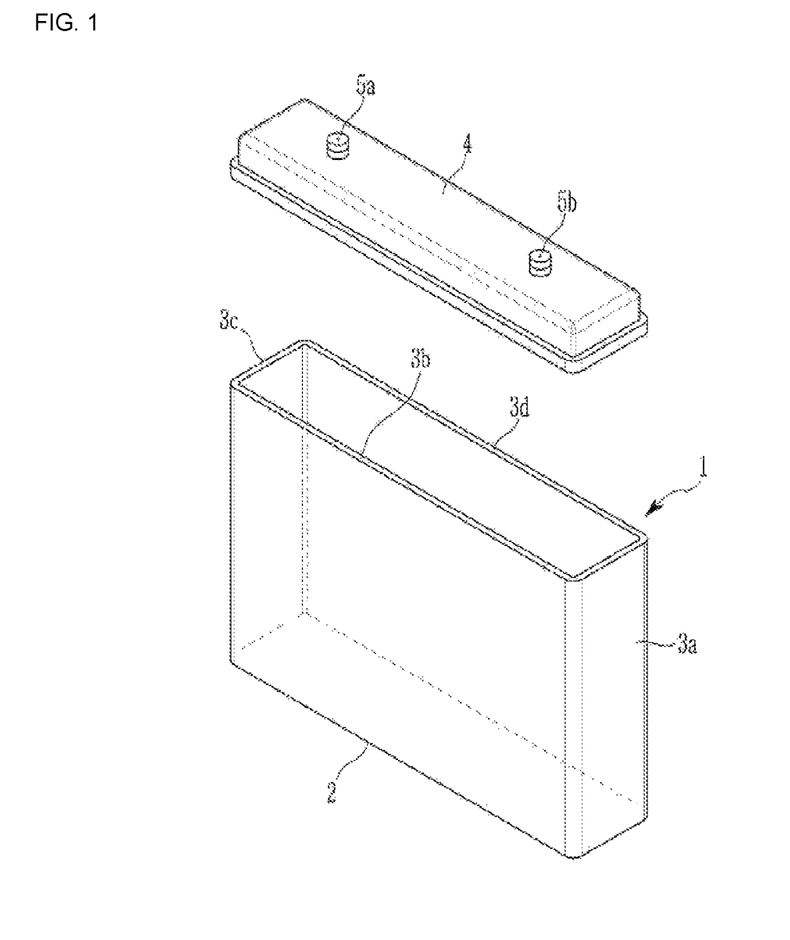
FIG. 1 is an exploded perspective view showing a battery case according to an embodiment.

FIG. 1 is an exploded perspective view of a battery case according to an embodiment.

Referring to FIG. 1, a battery case according to an embodiment includes a container 1 including a bottom wall 2 and a plurality of (e.g., 3, 4, or greater) side walls 3a, 3b, 3c, and 3d that are integrated to provide a space for accommodating an electrode assembly. The container 1 has an open side opposed to the bottom wall 2 and an electrode assembly may be accommodated in the container 1 through the open side. The battery case may further include a lid 4 to cover (e.g., seal) at least a portion, for example, a whole part of the open side of the container 1. The lid 4 may have at least one of the positive terminal 5a and the negative terminal 5b (e.g., positive terminal and negative terminal). The lid 4 may include the same material as the container 1 or a different material from the container 1.

Figure 2:
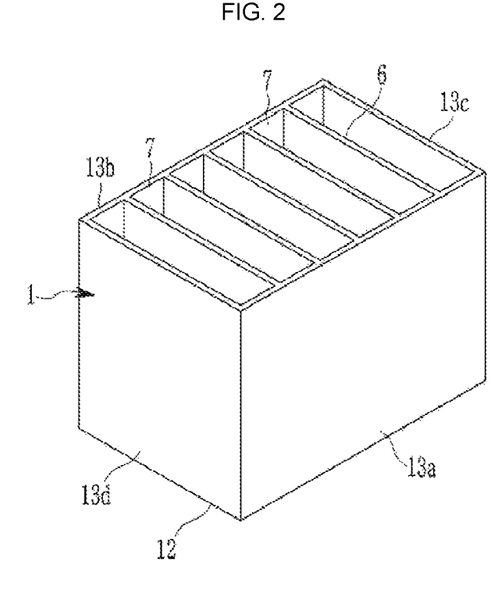
FIG. 2 is an exploded perspective view showing a battery case according to another embodiment.

FIG. 2 is an exploded perspective view of a battery case according to another embodiment.

Referring to FIG. 2, a container 1 of a battery case according to an exemplary embodiment has a space formed by integrating a bottom wall 12 with a plurality of side walls 13a, 13b, 13c, and 13d, and in the space, at least one, for example 2, 3, 4, 5, or more partition walls 6 is provided. The space in the container 1 may include a plurality of 2 or more, for example, 3 or more, for example, 4 or more, or 5 or more battery cell compartments 7 defined by the partition wall 6. Each battery cell compartment 7 may include an electrode assembly including a positive electrode and a negative electrode that will be described below.

FIGS. 1 and 2 show a rectangular parallelepiped battery case, but the battery case according to an embodiment has no limit to the shape but may have various shapes and sizes and the various numbers of containers and cell compartments.

A battery or a battery module according to an embodiment may be manufactured by accommodating an electrode assembly including positive and negative electrodes in the container 1 of the battery case in FIG. 1 or respectively in a plurality of cell compartments 7 in the container 1 in FIG. 2. This battery or battery module is manufactured by accommodating the electrode assembly in the container 1 or respectively in the cell compartments 7 of the battery case in FIG. 1 or 2, and then, injecting an electrolyte solution into the container 1 or the cell compartments 7 to supply the electrode assembly with the electrolyte solution. After injecting the electrolyte solution into the container 1 or the cell compartment 7 in which the electrode assembly is disposed, an open side of each battery case is closed or sealed with the lid 4 to manufacture the battery or battery module according to an embodiment.

As described above, the battery case according to an embodiment may have significantly improved mechanical properties, for example, significantly improved impact strength and tensile strength, as well as may have improved moisture transmission resistivity, which may not be achieved by the conventional plastic or a plastic-based article including the liquid crystal polymer, thereby it may be a substitute for the conventional metallic battery case.

In the battery or the battery module according to an embodiment, an electrode assembly including a positive electrode and a negative electrode may be accommodated directly into the container of the battery case according to an embodiment, without wrapping the same with an additional exterior material such as a metal pouch, and the like, to form a battery cell. Conventionally, an electrode assembly including positive and negative electrodes is formed, and then, wrapped with a metal pouch having moisture transmission resistivity to form a battery cell, and then, packed in a metallic battery case having a battery cell container to manufacture a battery or a battery module, which is complicated in terms of a process, takes a long time, and with increasingly high costs.

As described above, the battery case according to an embodiment may have improved moisture transmission resistivity and mechanical strength, since a bottom wall and at least one of a plurality of side walls forming the container, for example, both the bottom wall and a plurality of side walls include an article including the liquid crystal polymer as described herein. As described above, the battery case may be kept sealed by covering and sealing an open side of the container of the battery case with a lid covering at least a portion of the open side, for example, a whole side of the open side. The lid may also be manufactured from an article including the liquid crystal polymer or the composite composition including the liquid crystal polymer and the inorganic moisture absorbent which may form the container of the battery case.

Hereinafter, the electrode assembly is described.

The electrode assembly includes a positive electrode, a negative electrode, and a separator disposed therebetween. The electrode assembly may further include, for example an aqueous non-aqueous electrolyte solution in the separator. The types of the electrode assembly are not particularly limited. In an embodiment, the electrode assembly may include an electrode assembly for a rechargeable lithium battery. The positive electrode, the negative electrode, the separator, and the electrolyte solution of the electrode assembly may be appropriately selected according to types of the electrode and are not particularly limited. Hereinafter, the electrode assembly for a rechargeable lithium battery is exemplified but the present disclosure is not limited thereto.

The positive electrode may include, for example, a positive active material disposed on a positive current collector and may further include at least one of a conductive material and a binder. The positive electrode may further include a filler. The negative electrode may include, for example a negative active material disposed on a negative current collector and may further include at least one of a conductive material and a binder. The negative electrode may further include a filler.

The positive active material may include, for example a (solid solution) oxide including lithium but is not particularly limited as long as it is a material capable of intercalating and de-intercalating lithium ions electrochemically. The positive active material may be a layered compound such as lithium cobalt oxide ($LiCoO_2$), lithium nickel oxide ($LiNiO_2$), and the like, a compound substituted with one or more transition metal; a lithium manganese oxide such as chemical formulae $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$), vanadium oxide such as $LiV_3O_8$, $LiFe_3O_4$, $V_2O_5$, $Cu_2V_2O_7$, and the like; a Ni site-type lithium nickel oxide represented by chemical formula $LiNi_{1-x}M_xO_2$ (wherein, M is Co, Mn, Al, Cu, Fe, Mg, B, or Ga and x is 0.01 to 0.3); a lithium manganese composite oxide represented by chemical formula $LiMn_{2-x}M_xO_2$ (wherein, M is Co, Ni, Fe, Cr, Zn, or Ta and x is 0.01 to 0.1) or $Li_2Mn_3MO_8$ (wherein, M is Fe, Co, Ni, Cu, or Zn); $LiMn_2O_4$ where a portion of Li of chemical formula is substituted with an alkaline-earth metal ion; a disulfide compound; $Fe_2(MoO_4)_3$, and the like, but is not limited thereto.

Examples of the conductive material may include carbon black such as ketjen black, acetylene black, and the like, natural graphite, artificial graphite, and the like, but is not particularly limited as long as it may increase conductivity of the positive electrode.

The binder may be for example, polyvinylidene fluoride, an ethylene-propylene-diene terpolymer, a styrene-butadiene rubber, an acrylonitrile-butadiene rubber, a fluorine rubber, polyvinyl acetate, polymethyl methacrylate, polyethylene, nitrocellulose, and the like, but is not particularly limited as long as it may bind the (positive or negative) active material and the conductive material on the current collector. Examples of the binder may be polyvinyl alcohol, carboxylmethyl cellulose (CMC), starch, hydroxypropyl cellulose, recycled cellulose, tetrafluoroethylene, polyethylene, polypropylene, an ethylene-propylene-diene polymer (EPDM), sulfonated EPDM, a styrene-butene rubber, a fluorine rubber, various copolymers, polymeric highly saponified polyvinyl alcohol, and the like in addition to the foregoing materials.

The negative active material may be for example, carbon and graphite materials such as natural graphite, artificial graphite, expanded graphite, carbon fiber, non-graphizable carbon, carbon black, carbon nanotube, fullerene, activated carbon, and the like; a metal such as Al, Si, Sn, Ag, Bi, Mg, Zn, In, Ge, Pb, Pd, Pt, Ti, and the like that may be an alloy with lithium and a compound including such an element; a composite material of a metal and a compound thereof and carbon and graphite materials; a lithium-containing nitride, and the like. Carbon-based active materials, silicon-based active materials, tin-based active materials, or silicon-carbon-based active materials may be desirably used and may be used alone or in a combination of two or more.

The separator is not particularly limited and may be any suitable separator of a rechargeable lithium battery. For example, a porous film or non-woven fabric having high rate discharge performance may be used alone or in a mixture thereof. The separator may include pores and the pores may have a pore diameter of about 0.01 micrometer (μm) to about 10 μm and a thickness of about 5 μm to about 300 μm. A substrate of the separator may include, for example, a polyolefin-based resin, a polyester-based resin, polyvinylidene fluoride (PVDF), a vinylidene fluoride-hexafluoropropylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoroacetone copolymer, a vinylidene fluoride-ethylene copolymer, a vinylidene fluoride-propylene copolymer, a vinylidene fluoride-trifluoropropylene copolymer, a vinylidene fluoride-tetrafluoroethylene-hexafluoropropylene copolymer, a vinylidene fluoride-ethylene-tetrafluoroethylene copolymer, and the like. When the electrolyte is a solid electrolyte such as a polymer, the solid electrolyte may function as a separator.

The conductive material is a component to further improve conductivity of an active material and may be included in an amount of about 1 wt % to about 30 wt % based on a total weight of the electrode, but is not limited thereto. Such a conductive material is not particularly limited as long as it does not cause chemical changes of a battery and has suitable conductivity, and may be for example, graphite such as natural graphite or artificial graphite; carbon black such as carbon black, acetylene black, ketjen black, channel black, furnace black, lamp black, summer black, and the like; a carbon derivative such as carbon nanotube, fullerene, and the like, a conductive fiber such as a carbon fiber or a metal fiber, and the like; carbon fluoride, a metal powder such as aluminum, a nickel powder, and the like; a conductive whisker such as zinc oxide, potassium titanate, and the like; a conductive metal oxide such as a titanium oxide; a conductive material such as a polyphenylene derivative, and the like.

The filler is an auxiliary component to suppress expansion of an electrode, is not particularly limited as long as it does not cause chemical changes of a battery and is a fiber-shaped material, and may be for example, an olefin-based polymer such as polyethylene, polypropylene, and the like; a fiber-shaped material such as a glass fiber, a carbon fiber, and the like.

In the electrode, the current collector may be a site where electron transports in an electrochemical reaction of the active material and may be a negative current collector and a positive current collector according to types of the electrode. The negative current collector may have a thickness of about 3 μm to about 500 μm. The negative current collector is not particularly limited as long as it does not cause chemical changes of a battery and has conductivity and may be, for example, copper, stainless steel, aluminum, nickel, titanium, fired carbon, copper or stainless steel that is surface-treated with carbon, nickel, titanium, silver, or the like, an aluminum-cadmium alloy, and the like.

The positive current collector may have a thickness of about 3 μm to about 500 μm, but is not limited thereto. Such a positive current collector is not particularly limited as long as it does not cause chemical changes of a battery and has high conductivity and may be, for example, stainless steel, aluminum, nickel, titanium, fired carbon, or aluminum or stainless steel that is surface-treated with carbon, nickel, titanium, silver, or the like.

The current collectors may have a fine concavo-convex form on its surface to reinforce a binding force of the active material and may be used in various shapes of a film, a sheet, a foil, a net, a porous film, a foam, a non-woven fabric, or the like.

The lithium-containing non-aqueous electrolyte solution may include or consist of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy furan, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and the like.

The lithium salt is a material that is dissolved in the non-aqueous electrolyte solution and may be, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, LiSbFe, $LiAlCl_4$, $CH_3SO_3Li$, $CF_3SO_3Li$, $(CF_3SO_2)_2NLi$, lithium chloro borane, lower aliphatic lithium carbonate, lithium tetraphenyl borate, imides, and the like.

An organic solid electrolyte, an inorganic solid electrolyte, and the like may be used as needed.

The organic solid electrolyte may be, for example, a polyethylene derivative, a polyethylene oxide derivative, a polypropylene oxide derivative, a phosphoric acid ester polymer, a poly(L-lysine, a polyester sulfide, polyvinyl alcohol, polyvinylidene fluoride, a polymer including an ionic leaving group, and the like.

The inorganic solid electrolyte may be, for example, nitrides of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like, halides, sulfates, and the like.

The non-aqueous electrolyte solution may include, for example, pyridine, triethylphosphite, triethanolamine, cyclic ether, ethylene diamine, n-glyme, hexa phosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride in order to improve charge and discharge characteristics, flame retardancy, and the like. As needed, in order to endow inflammability, a halogen-containing solvent such as carbon tetrachloride, ethylene trifluoride, and the like may be further added and in order to improve high temperature storage characteristics, carbon dioxide gas may be further added.

As described above, a battery or a battery module including a battery case according to an embodiment may not require wrapping of an electrode assembly with an exterior material consisting of an additional moisture transmission resist material, so a container of the battery case or the electrode assembly accommodated in each cell compartment of the container may not include an additional exterior material, and the battery or the battery module according to an embodiment may be easily manufactured by simply accommodating the electrode assembly.

Hereinafter, the embodiments are described with reference to examples and comparative examples. The following examples and comparative examples are exemplary but do not limit the scope of the present disclosure.

EXAMPLES

Example 1: Synthesis of Liquid Crystal Polymer

First, 43 gram (g) of hydroxybenzoic acid (HBA), 38.79 g of isophthalic acid (IPA), 14.49 g of biphenol (BP), 17.14 g of hydroquinone (HQ), and 95.35 g of acetic anhydride are introduced into a 200 milliliters (ml) glass reactor equipped with a torque meter, a thermometer, and a reflux condenser to assemble a reactor, then the reaction temperature is increased to 140° C. at 150 revolutions per minute (rpm) over 30 minutes (min) and maintained at 140° C. for 1 hour. Subsequently, the reflux condenser is replaced with a dean-stark condenser and the reaction mixture is slowly heated up to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Example 2: Synthesis of Liquid Crystal Polymer

First, 43 g of hydroxybenzoic acid (HBA), 38.79 g of isophthalic acid (IPA), 18.84 g of biphenol (BP), 14.57 g of hydroquinone (HQ), and 95.35 g of acetic anhydride are introduced into a 200 ml glass reactor equipped with a torque meter, a thermometer, and a reflux condenser to assemble a reactor, then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and the reaction is quenched when the agitation torque is 0.4 ampere (A) on reaching 10 Torr, and a polymerized product of a liquid crystal polymer is recovered.

Example 3: Synthesis of Liquid Crystal Polymer

First, 43 g of hydroxybenzoic acid (HBA), 38.79 g of isophthalic acid (IPA), 21.74 g of biphenol (BP), 12.85 g of hydroquinone (HQ), and 95.35 g of acetic anhydride are introduced into a 200 ml glass reactor equipped with a torque meter, a thermometer, and a reflux condenser to assemble a reactor, then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and the reaction is quenched when the agitation torque is 0.4 ampere (A) on reaching 10 Torr, and a polymerized product of a liquid crystal polymer is recovered.

Example 4: Synthesis of Liquid Crystal Polymer

First, 43 g of hydroxybenzoic acid (HBA), 38.79 g of isophthalic acid (IPA), 7.25 g of biphenol (BP), 21.42 g of hydroquinone (HQ), and 95.35 g of acetic anhydride are introduced into a 200 ml glass reactor equipped with a torque meter, a thermometer, and a reflux condenser to assemble a reactor, then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Example 5: Synthesis of Liquid Crystal Polymer

First, 50 g of hydroxybenzoic acid (HBA), 30.07 g of isophthalic acid (IPA), 13.48 g of biphenol (BP), 11.96 g of hydroquinone (HQ), and 88.7 g of acetic anhydride are introduced into a 200 ml glass reactor equipped with a torque meter, a thermometer, and a reflux condenser to assemble a reactor, then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and the reaction is quenched when the agitation torque is 0.4 ampere (A) on reaching 10 Torr, and a polymerized product of a liquid crystal polymer is recovered.

Example 6: Synthesis of Liquid Crystal Polymer

First, 43 g of hydroxybenzoic acid (HBA), 12.93 g of terephthalic acid (TPA), 25.86 g of isophthalic acid (IPA), 13.48 g of biphenol (BP), 17.14 g of hydroquinone (HQ), and 95.35 g of acetic anhydride are introduced into a 200 ml glass reactor equipped with a torque meter, a thermometer, and a reflux condenser to assemble a reactor, and then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Example 7: Synthesis of Liquid Crystal Polymer

First, 40 g of hydroxybenzoic acid (HBA), 36.08 g of isophthalic acid (IPA), 26.96 g of biphenol (BP), 7.97 g of hydroquinone (HQ), and 88.7 g of acetic anhydride are introduced into a 200 ml glass reactor equipped with a torque meter, a thermometer, and a reflux condenser to assemble a reactor, and then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Example 8: Synthesis of Liquid Crystal Polymer

First, 30 g of hydroxybenzoic acid (HBA), 42.1 g of isophthalic acid (IPA), 13.48 g of biphenol (BP), 19.93 g of hydroquinone (HQ), and 88.7 g of acetic anhydride are introduced into a 200 ml glass reactor equipped with a torque meter, a thermometer, and a reflux condenser to assemble a reactor, then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Comparative Example 1: Synthesis of Liquid Crystal Polymer

First, 45 g of hydroxybenzoic acid (HBA), 40.59 g of isophthalic acid (IPA), 26.91 g of hydroquinone (HQ), and 99.8 g of acetic anhydride are introduced into a 200 ml glass reactor equipped with a torque meter, a thermometer, and a reflux condenser to assemble a reactor, then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., when the pressure is slowly reduced to 50 Torr, and after 10 minutes, the polymerization reactant is solidified, so that the polymerization reaction may not be performed any more.

Comparative Example 2: Synthesis of Liquid Crystal Polymer

First, 60 g of hydroxybenzoic acid (HBA), 6.01 g of terephthalic acid (TPA), 18.04 g of isophthalic acid (IPA), 40.45 g of biphenol (BP), and 88.7 g of acetic anhydride are introduced into a 200 ml glass reactor equipped with a torque meter, a thermometer, and a reflux condenser to assemble a reactor, and then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Comparative Example 3: Synthesis of Liquid Crystal Polymer

First, 60 g of hydroxybenzoic acid (HBA), 12.03 g of terephthalic acid (TPA), 12.03 g of isophthalic acid (IPA), 26.96 g of biphenol (BP), and 88.7 g of acetic anhydride are introduced into a 200 ml glass reactor equipped with a torque meter, a thermometer, and a reflux condenser to assemble a reactor, then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Comparative Example 4: Synthesis of Liquid Crystal Polymer

First, 60 g of hydroxybenzoic acid (HBA), 18.04 g of terephthalic acid (TPA), 6.01 g of isophthalic acid (IPA), 26.96 g of biphenol (BP), and 88.7 g of acetic anhydride are introduced into a 200 ml glass reactor equipped with a torque meter, a thermometer, and a reflux condenser to assemble a reactor, and then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Comparative Example 5: Synthesis of Liquid Crystal Polymer

First, 50 g of hydroxybenzoic acid (HBA), 30.07 g of isophthalic acid (IPA), 33.7 g of biphenol (BP), and 88.7 g of acetic anhydride are introduced into a 200 ml glass reactor equipped with a torque meter, a thermometer, and a reflux condenser to assemble a reactor, and then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Comparative Example 6: Synthesis of Liquid Crystal Polymer

First, 50 g of hydroxybenzoic acid (HBA), 12.03 g of terephthalic acid (TPA), 18.04 g of isophthalic acid (IPA), 26.96 g of biphenol (BP), 3.66 g of hydroquinone (HQ), and 88.7 g of acetic anhydride are introduced into a 200 ml glass reactor equipped with a torque meter, a thermometer, and a reflux condenser to assemble a reactor, and then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Comparative Example 7: Synthesis of Liquid Crystal Polymer

First, 50 g of hydroxybenzoic acid (HBA), 18.04 g of terephthalic acid (TPA), 12.03 g of isophthalic acid (IPA), 33.7 g of biphenol (BP), and 88.7 g of acetic anhydride are introduced into a 200 ml glass reactor equipped with a torque meter, a thermometer, and a reflux condenser to assemble a reactor, and then the reaction temperature is increased to 140° C. at 150 rpm over 30 minutes and maintained at 140° C. for 1 hour. Subsequently, the reflux condenser is replaced with a dean-stark condenser, and then the temperature of the reaction mixture is slowly increased to 330° C. over 2 hours. At 330° C., the pressure is slowly reduced to 10 Torr over 30 minutes, and then the reaction is quenched when the agitation torque is 0.4 ampere (A) on reaching 10 Torr, and a polymerized product of a liquid crystal polymer is recovered.

Evaluation: Evaluation of Moisture Transmission Resistivity and Mechanical Properties of Liquid Crystal Polymer Each of the liquid crystal polymers obtained from Examples 1 to 8 and Comparative Examples 1 to 7 is ground by a grinder to a pellet length of less than or equal to 1 centimeters (cm), and is flowed into an extruder including two screw axes heated at 280° C. and rotating in the same direction and mixed, and then injection-molded at 310° C. to provide a specimen article for measuring physical properties in a circle shape having a thickness of about 1 millimeters (mm) and a diameter of about 30 mm. For each specimen, a water vapor transmission rate (WVTR), an impact strength, and a tensile modulus are measured by the following method.

(1) Water Vapor Transmission Rate (WVTR): the water vapor transmission rate is measured at 38° C., under relative humidity of 100% using Aquatran equipment (Mocon Inc.) according to ISO15106-3.

(2) Tensile Strength: measured at a tensile rate of 50 mm/min using a Cometech (QC-506BA) according to ASTM D638.

(3) Impact Strength: An un-notched type Izod impact strength is measured using an Instron (impactor II, CEAST 9050) according to ASTM D256.

The composition, the measured water vapor transmission rate, impact strength, and tensile strength of each article specimen prepared from the liquid crystal polymer obtained from Examples 1 to 8 and Comparative Examples 1 to 7 are shown in Table 1.

In addition, also for the commercially available liquid crystal polymer W-A950 (product of China WOTE) made of 73 mol % of hydroxybenzoic acid (HBA) and 27 mol % of hydroxy naphthoic acid (HNA), water vapor transmission rate, impact strength, and tensile strength are measured according to the method, and the results are shown in Table 1 as Comparative Example 8.

TABLE 1

| | Composition (mol %) | | | | | Mechanical properties | | |
| --- | --- | --- | --- | --- | --- | --- | --- | --- |
| | HBA | TPA | IPA | BP | HQ | WVTR (g/m$^2$/day) | Impact strength (kJ/m$^2$) | Tensile strength (kgf/cm$^2$) |
| Example 1 | 40 | — | 30 | 10 | 20 | 0.03 | 88 | 1410 |
| Example 2 | 40 | — | 30 | 13 | 17 | 0.032 | 98 | 1500 |
| Example 3 | 40 | — | 30 | 15 | 15 | 0.06 | 70 | 1350 |
| Example 4 | 40 | — | 30 | 5 | 25 | — | 52 | 1400 |
| Example 5 | 50 | | 25 | 10 | 15 | 0.1 | 52 | 1400 |
| Example 6 | 40 | 10 | 20 | 10 | 20 | 0.06 | 35 | 1257 |
| Example 7 | 40 | — | 30 | 20 | 10 | 0.1 | 100 | 400 |
| Example 8 | 30 | — | 35 | 10 | 25 | 0.08 | 42 | 1200 |
| Comparative Example 1 | 40 | — | 30 | — | 30 | polymerization failure by solidification of polymerized product | | |
| Comparative Example 2 | 60 | 5 | 15 | 20 | — | 0.17 | 20 | 887 |
| Comparative Example 3 | 60 | 10 | 10 | 20 | — | 0.15 | 32 | 1026 |
| Comparative Example 4 | 60 | 15 | 5 | 20 | — | 0.16 | 15 | 295 |
| Comparative Example 5 | 50 | — | 25 | 25 | — | 0.2 | 29 | 751 |
| Comparative Example 6 | 50 | 10 | 15 | 20 | 5 | 0.15 | 48 | 1352 |
| Comparative Example 7 | 50 | 15 | 10 | 25 | — | 0.18 | 37 | 1170 |
| Comparative Example 8 | | W-A950 | | | | 0.07 | 16 | 1542 |

As can be seen in Table 1, each of the liquid crystal polymers according to Examples 1 to 8, which is prepared by including aromatic hydroxy carboxylic acid (HBA) in an amount of greater than 30 mol %, a compound having two carboxyl groups at a meta-position (IPA) in an amount of greater than or equal to 50 mol % of the amount of the aromatic dicarboxylic acid, wherein the compound having two carboxyl groups at the meta-position (IPA) is included in an amount of greater than or equal to 50 mol % with respect to the aromatic hydroxy carboxylic acid (HBA), and both aromatic 4,4'-dihydroxybiphenyl (BP) and hydroquinone (HQ) as an aromatic diol compound exhibits a water vapor transmission rate of less than or equal to about 0.1 g/m$^2$/day, an impact strength of greater than or equal to about 35 kJ/m$^2$, and a tensile strength of greater than or equal to about 400 kgf/cm$^2$. The liquid crystal polymers according to the Examples have significantly lower water vapor transmission rates than the liquid crystal polymers according to Comparative Examples 1 to 7. Furthermore, the liquid crystal polymers according to the Examples (except the liquid crystal polymer according to Example 8) have a higher impact strength than any liquid crystal polymers according to the Comparative Examples. The liquid crystal polymers according to the Examples (except the liquid crystal polymer according to Examples 6 to 8) also have a tensile strength higher than or similar to the tensile strength of the liquid crystal polymers according to almost all of the Comparative Examples.

The water vapor transmission rate of the commercially available liquid crystal polymer according to Comparative Example 8 is similar to that of the liquid crystal polymers according to the Examples, tensile strength is the highest, but impact strength is the lowest among all of the Examples and Comparative Examples.

As mentioned above, the water vapor transmission rates of the liquid crystal polymers according to all the Examples are lower than the water vapor transmission rates of the other liquid crystal polymers (except the liquid crystal polymer according to Comparative Example 8), and although impact strength or tensile strength of the liquid crystal polymers according to some Examples is lower than that of the liquid crystal polymers according to some Comparative Examples, the liquid crystal polymers according to almost all of the Examples have significantly higher or similar impact strength and tensile strength than the liquid crystal polymers according to the Comparative Examples.

Hereinafter, results from additional Examples and Comparative Examples including an inorganic moisture absorbent are described.

When a composition in which an inorganic moisture absorbent, for example CaO, for improving moisture transmission resistivity is mixed with the liquid crystal polymer according to an embodiment in a predetermined amount and is processed to provide an article, moisture transmission resistivity is significantly improved. Furthermore, mechanical properties, such as, for example, impact strength and/or tensile strength, are improved or at least maintained similarly to the level before including the inorganic moisture absorbent. The results show that both moisture transmission resistivity and mechanical properties may be simultaneously improved when the article is produced not only by including only the liquid crystal polymers according to Examples, but by including the same together with an inorganic moisture absorbent for improving moisture transmission resistivity, which are not easily anticipated from the conventional liquid crystal polymer. For example, in a case of the conventional liquid crystal polymer, for example the commercially available liquid crystal polymer according to Comparative Example 8, when an article is produced from the composite including the liquid crystal polymer and 10 mol % of CaO, moisture transmission resistivity is improved, but tensile strength is decreased compared with the article prepared only from the liquid crystal polymer, and impact strength is further lowered, so that it may not be effectively used for applications requiring both moisture transmission resistivity and mechanical strength.

The additional Examples and Comparative Examples relating to the addition of an inorganic moisture absorbent are described as follows:

Additional Example and Comparative Example:
Preparation and Evaluation of Composite Including Inorganic Moisture Absorbent During preparation of the articles from the liquid crystal polymers according to Examples 1 to 3, an inorganic moisture absorbent of CaO is added thereto in 10 wt % (Example 1-1, Example 2-1 and Example 3-1) and 30 wt % (Example 1-2, Example 2-2 and Example 3-2), respectively; and during preparation of the articles from the liquid crystal polymer according to Example 5, an inorganic moisture absorbent of CaO is added in an amount of 10 wt % (Example 5-1), 30 wt % (Example 5-2), and 32 wt % (Example 5-3), respectively; for Comparative Example 8, an article (Comparative Example 8-1) is produced from a composite that includes 10 wt % of an inorganic moisture absorbent of CaO, as well as the commercially available liquid crystal polymer W-A950. Then water vapor transmission rate (WVTR), impact strength, and tensile strength thereof are measured in accordance with the same method as described above, and the results are shown in Table 2 along with the results of the articles produced by using the liquid crystal polymers according to Examples 1 to 3 and 5 and Comparative Example 8. The composites according to the Examples and Comparative Examples are produced by uniformly mixing a CaO powder into 20 or lower mesh-ground liquid crystal polymer, heating the same at 300° C., and introducing the same into an extruder having two screw axes heated at 300° C. and rotating in the same direction.

TABLE 2

| | LCP (wt %) | CaO (wt %) | WVTR (g/m$^2$/day) | Impact strength * (kJ/m$^2$) | Tensile strength (kgf/cm$^2$) |
|---|---|---|---|---|---|
| Example 1 | 100 | 0 | 0.03 | 88 | 1410 |
| Example 1-1 | 90 | 10 | <0.0005 | 94 | 1480 |
| Example 1-2 | 70 | 30 | <0.0005 | 90 | 1478 |
| Example 2 | 100 | 0 | 0.032 | 98 | 1500 |
| Example 2-1 | 90 | 10 | <0.0005 | 102 | 1497 |
| Example 2-2 | 70 | 30 | <0.0005 | 100 | 1499 |
| Example 3 | 100 | 0 | 0.06 | 70 | 1350 |
| Example 3-1 | 90 | 10 | <0.0005 | 72 | 1330 |
| Example 3-2 | 70 | 30 | <0.0005 | 73 | 1340 |
| Example 5 | 100 | 0 | 0.1 | 52 | 1400 |
| Example 5-1 | 90 | 10 | <0.0005 | 60 | 1420 |
| Example 5-2 | 70 | 30 | <0.0005 | 59 | 1419 |
| Comparative Example 5-3 | 68 | 32 | <0.0005 | 41 | 1400 |
| Comparative Example 8 | 100 | 0 | 0.06 | 16 | 1547 |
| Comparative Example 8-1 | 90 | 10 | 0.002 | 10 | 1494 |

In Table 2, LCP indicates a liquid crystal polymer prepared or used in each example and comparative example.

As shown in Table 2, in the article obtained from the composite in which 10 wt % of inorganic moisture absorbent is added to the liquid crystal polymers according to Examples 1 to 3 and 5, moisture transmission resistivity is greatly increased by almost 100 times, and impact strength is increased to at least 4% to at most 15%. In addition, in the cases of the Examples, even in the cases of adding the inorganic moisture absorbent up to 30 wt %, the significantly increased level of moisture transmission resistivity is maintained, and also impact strength is maintained in almost same level. From these Examples, it can be seen that tensile strength is partially increased or partially decreased even in the case of including the inorganic moisture absorbent in 10 wt % or 30 wt %, but the variation range is insignificant and is similar to the level of not including the inorganic moisture absorbent. The results are completely different and unexpected in view of the results that impact strength is significantly deteriorated when the article is produced from the composite including the conventional liquid crystal polymer and an inorganic moisture absorbent for improving moisture transmission resistivity.

In particular, in an article according to Comparative Example 8-1 including the commercially liquid crystal polymer of W-A950 with 10 wt % of CaO added, moisture transmission resistivity is increased by 10 times or greater, but impact strength is further deteriorated compared with the conventional article, and tensile strength is also further deteriorated, so the effects on improving mechanical properties may not be obtained along with enhancing moisture transmission resistivity.

As confirmed above, the liquid crystal polymer according to an embodiment includes a structural unit derived from the aromatic hydroxy carboxylic acid in an amount of greater than about 30 mol % and less than or equal to about 50 mol %, a structural unit derived from a compound having two carboxyl groups at a meta-position of an aromatic ring (IPA) as the aromatic dicarboxylic acid in an amount of greater than or equal to about 50 mol % based on total moles of the structural units derived from the aromatic dicarboxylic acid, wherein an amount of the structural unit derived from the compound including two carboxyl groups at a meta-position of an aromatic ring (IPA) is greater than or equal to about 50 mol % of the amount of the structural unit derived from the aromatic hydroxy carboxylic acid, and both structural units derived from 4,4'-dihydroxybiphenyl (BP) and hydroquinone (HQ) as the aromatic diol, so that the liquid crystal polymer may have, by itself, excellent moisture transmission resistivity and mechanical properties, and as well, when a composite is produced by adding an inorganic moisture absorbent into the liquid crystal polymer, moisture transmission resistivity is enhanced, and mechanical properties are also further enhanced. The liquid crystal polymer and the composite may be usefully applied for a variety of products requiring moisture transmission resistivity and high mechanical properties.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal polymer, comprising
structural units derived from an aromatic hydroxy carboxylic acid, an aromatic dicarboxylic acid, and an aromatic diol,
wherein based on total moles of the structural units in the liquid crystal polymer,
the structural unit derived from the aromatic hydroxy carboxylic acid is included in an amount of greater than about 30 mol % and less than or equal to about 50 mol %,
the structural unit derived from the aromatic dicarboxylic acid comprises about 50 mol % or greater of a structural unit derived from a compound comprising two carboxyl groups at a meta-position of an aromatic ring, and an amount of the structural unit derived from the compound comprising two carboxyl groups at a meta-position of an aromatic ring is greater than or equal to about 50 mol % of the amount of the structural unit derived from the aromatic hydroxy carboxylic acid, and
the structural unit derived from the aromatic diol comprises a structural unit derived from 4,4'-dihydroxybiphenyl and a structural unit derived from hydroquinone.

2. The liquid crystal polymer of claim 1, wherein the structural unit derived from the aromatic hydroxy carboxylic acid is represented by Chemical Formula 1 or Chemical Formula 2:

Chemical Formula 1

Chemical Formula 2

3. The liquid crystal polymer of claim 1, wherein the structural unit derived from the aromatic hydroxy carboxylic acid comprises a structural unit derived from p-hydroxybenzoic acid, a structural unit derived from 6-hydroxy-2-naphthoic acid, or a combination thereof.

4. The liquid crystal polymer of claim 1, wherein the structural unit derived from the compound comprising two carboxyl groups at the meta-position of an aromatic ring comprises a structural unit derived from isophthalic acid.

5. The liquid crystal polymer of claim 1, wherein the amount of the structural unit derived from the compound comprising two carboxyl groups at the meta-position of an aromatic ring is greater than or equal to about 60 mol % of the amount of the structural unit derived from the aromatic hydroxy carboxylic acid.

6. The liquid crystal polymer of claim 1, wherein the amount of the structural unit derived from the compound comprising two carboxyl groups at the meta-position of the aromatic ring is greater than or equal to about 70 mol % of the amount of the structural unit derived from the aromatic hydroxy carboxylic acid.

7. The liquid crystal polymer of claim 1, wherein a mole ratio of the structural unit derived from hydroquinone relative to the structural unit derived from 4,4'-dihydroxybiphenyl in the structural unit derived from the aromatic diol is greater than or equal to about 1.0:1.0.

8. The liquid crystal polymer of claim 1, wherein a mole ratio of the structural unit derived from hydroquinone relative to the structural unit derived from 4,4'-dihydroxybiphenyl in the structural unit derived from the aromatic diol is greater than or equal to about 1.0:1.0 and less than about 5.0:1.0.

9. A composite composition comprising the liquid crystal polymer of claim 1 and an inorganic moisture absorbent.

10. The composite composition of claim 9, wherein the inorganic moisture absorbent comprises a silica gel, zeolite, CaO, BaO, $MgSO_4$, $Mg(ClO_4)_2$, MgO, $P_2O_5$, $Al_2O_3$, $CaH_2$, NaH, $LiAlH_4$, $CaSO_4$, $Na_2SO_4$, $CaCO_3$, $K_2CO_3$, $CaCl_2$, $Ba(ClO_4)_2$, Ca, or a combination of two or more.

11. The composite composition of claim 9, wherein the inorganic moisture absorbent is included in an amount of less than or equal to about 30 wt % based on a total weight of the composite composition.

12. An article comprising the liquid crystal polymer of claim 1.

13. An article comprising the composite composition of claim 9.

14. The article of claim 12, wherein the article has a water vapor transmission rate of less than about 0.1 gram per square meter per day measured at 38° C. under a relative humidity of 100% according to ISO 15106 or ASTM F1249, and an impact strength measured according to ASTM D256 of greater than about 35 kiloJoules per square meter.

15. The article of claim 13, wherein the composite composition comprises the inorganic moisture absorbent in an amount of greater than or equal to about 1 wt % and less than or equal to about 30 wt % based on a total weight of the composition.

16. The article of claim 15, wherein the article has a water vapor transmission rate of less than about 0.07 gram per square meter per day measured at 38° C. under a relative humidity of 100% according to ISO 15106 or ASTM F1249, and an impact strength measured according to ASTM D256 of greater than or equal to about 59 kiloJoules per square meter.

17. A battery case comprising the article of claim 12.

18. The battery case of claim 17, wherein the battery case comprises a container configured to accommodate an electrode assembly, wherein the container comprises a bottom wall and a plurality of side walls, a side opposed to the bottom wall is open to accommodate an electrode assembly therethrough, and the battery case comprises a lid configured to cover at least a portion of the open side.

19. The battery case of claim 18, wherein the container comprises a plurality of cell compartments separated by at least one partition wall.

20. A battery comprising
the battery case of claim 17, and
an electrode assembly comprising a positive electrode and a negative electrode accommodated in the container of the battery case.

* * * * *